(12) United States Patent
Billette et al.

(10) Patent No.: US 9,701,093 B2
(45) Date of Patent: Jul. 11, 2017

(54) SURFACE CONFORMING ACTIVATABLE ADHESIVE BODIES AND METHODS OF MAKING SAME

(71) Applicant: Zephyros, Inc., Romeo, MI (US)

(72) Inventors: David G. Billette, Sterling Heights, MI (US); Dean W. Smitterberg, Lapeer, MI (US); Yoshihiko Yasu, Matsudo (JP)

(73) Assignee: ZEPHYROS, INC., Romeo, MI (US)

( * ) Notice: Subject to any disclaimer, the term of this patent is extended or adjusted under 35 U.S.C. 154(b) by 145 days.

(21) Appl. No.: 13/924,827

(22) Filed: Jun. 24, 2013

(65) Prior Publication Data

US 2014/0322493 A1 Oct. 30, 2014

Related U.S. Application Data

(66) Substitute for application No. 61/817,428, filed on Apr. 30, 2013.

(Continued)

(51) Int. Cl.
*B32B 3/30* (2006.01)
*B32B 37/15* (2006.01)
(Continued)

(52) U.S. Cl.
CPC ............... *B32B 3/30* (2013.01); *B29C 44/18* (2013.01); *B32B 38/06* (2013.01); *B29C 59/026* (2013.01);
(Continued)

(58) Field of Classification Search
CPC .. B32B 3/30; B32B 3/00; B32B 37/15; B32B 37/153; B32B 37/203; B32B 38/06;
(Continued)

(56) References Cited

U.S. PATENT DOCUMENTS 3,285,768 A * 11/1966 Habib ........................... 428/160
3,378,432 A * 4/1968 Spencer ............... B29C 44/5636
156/209

(Continued)

FOREIGN PATENT DOCUMENTS

EP 0625559 A1 6/1998
EP 2409900 A1 1/2012
(Continued)

OTHER PUBLICATIONS

PCT International Search Report and Written Opinion of the International Searching Authority, PCT/US2013/047484, dated Jan. 15, 2014.

(Continued)

Primary Examiner — Nancy Johnson
(74) Attorney, Agent, or Firm — The Dobrusin Law Firm, P.C.

(57) ABSTRACT

A method for making an activatable material having a handling film layer thereon, comprising the steps of providing a continuous mass of a polymeric material having a longitudinal axis and being capable of adhering to a metal surface; applying a handling layer (e.g., film) over at least one side of the mass; forming stress relief indentations in the mass, with the handling layer at least partially extending into the indentations, wherein the stress relief indentations allow a resulting part to be applied in conforming geometry with a surface to which it is applied. The teachings also contemplate parts made by the above method and use thereof to bond to surfaces having a non-planar portion.

20 Claims, 2 Drawing Sheets

Related U.S. Application Data

(60) Provisional application No. 61/833,604, filed on Jun. 11, 2013, provisional application No. 61/825,690, filed on May 21, 2013.

(51) Int. Cl.
| | | |
|---|---|---|
| *B32B 38/06* | (2006.01) | |
| *B29C 44/18* | (2006.01) | |
| *B29C 59/02* | (2006.01) | |
| *B29C 59/04* | (2006.01) | |
| *B62D 29/00* | (2006.01) | |
| *B32B 37/20* | (2006.01) | |
| *B32B 38/00* | (2006.01) | |

(52) U.S. Cl.
CPC .......... *B29C 59/046* (2013.01); *B32B 37/203* (2013.01); *B32B 2038/0084* (2013.01); *B32B 2305/022* (2013.01); *B32B 2307/546* (2013.01); *B32B 2605/08* (2013.01); *B62D 29/002* (2013.01); *Y10T 156/1007* (2015.01); *Y10T 428/24612* (2015.01)

(58) Field of Classification Search
CPC . B32B 2605/08; B29C 59/026; B29C 59/046; B29C 44/18; Y10T 428/24612; Y10T 428/233; Y10T 428/24355; Y10T 428/24364; Y10T 428/24479; Y10T 428/24496; Y10T 428/24504; Y10T 428/24521; Y10T 428/24529; Y10T 428/24537; Y10T 428/24562; Y10T 428/2457; B62D 29/002
See application file for complete search history.

(56) References Cited

U.S. PATENT DOCUMENTS

| | | |
|---|---|---|
| 5,266,133 A | 11/1993 | Hanley et al. |
| 5,708,042 A | 1/1998 | Hasegawa |
| 5,766,719 A | 6/1998 | Rimkus |
| 6,270,600 B1 | 8/2001 | Wycech |
| 6,287,660 B1 | 9/2001 | Wycech |
| 6,455,146 B1 | 9/2002 | Fitzgerald |
| 7,144,071 B2 | 12/2006 | Le Gall et al. |
| 7,199,165 B2 | 4/2007 | Kassa et al. |
| 7,249,415 B2 | 7/2007 | Larsen et al. |
| 7,267,738 B2 * | 9/2007 | Czaplicki et al. ............ 156/278 |
| 7,521,093 B2 | 4/2009 | Finerman et al. |
| 7,527,850 B2 | 5/2009 | Muto et al. |
| 7,784,186 B2 | 8/2010 | White et al. |
| 7,941,925 B2 | 5/2011 | Larsen et al. |
| 7,984,919 B2 | 7/2011 | Nitsche et al. |
| 8,105,460 B2 | 1/2012 | Sheasley et al. |
| 8,236,128 B2 | 8/2012 | Kassa et al. |
| 8,545,956 B2 | 10/2013 | Sika |
| 2002/0096833 A1 | 7/2002 | Czaplicki et al. |
| 2003/0045620 A1 | 3/2003 | Carlson et al. |
| 2003/0124300 A1 | 7/2003 | Gregorio et al. |
| 2004/0266898 A1 | 12/2004 | Kassa et al. |
| 2007/0155904 A1 * | 7/2007 | Chou ............................ 525/207 |
| 2008/0060757 A1 | 3/2008 | Hable et al. |
| 2008/0308212 A1 | 12/2008 | Sheasley et al. |
| 2010/0259059 A1 | 10/2010 | Quaderer et al. |

FOREIGN PATENT DOCUMENTS

| | | |
|---|---|---|
| JP | 2003094475 | 4/2003 |
| WO | 95/25005 A1 | 9/1995 |
| WO | 98/36944 A1 | 8/1998 |
| WO | 00/46017 A1 | 8/2000 |
| WO | 2011/134943 A1 | 11/2011 |

OTHER PUBLICATIONS

Co-pending, U.S. Appl. No. 13/804,840, filed Mar. 14, 2013, Application and Drawings (21pages) included.
Co-pending, U.S. Appl. No. 61/705,857, filed Sep. 26, 2012, Application and Drawings (23pages) included.
U.S. Appl. No. 61/837,832, filed Jun. 21, 2013, Application and Drawings (32pages) included.

* cited by examiner

SURFACE CONFORMING ACTIVATABLE ADHESIVE BODIES AND METHODS OF MAKING SAME

CLAIM OF PRIORITY

The present application claims the benefit of the filing date of U.S. Provisional Application Ser. Nos. 61/833,604, filed Jun. 11, 2013; 61/825,690, filed May 21, 2013; and 61/817,428, filed Apr. 30, 2013, all hereby incorporated by reference.

TECHNICAL FIELD

The present invention relates generally to structural reinforcement, sealing and/or baffling of a cavity of an automotive vehicle, and more particularly to cavities defined by surfaces having a topography that includes a curvature, one or more bends or any combination thereof.

BACKGROUND

In the field of automotive vehicle manufacturing it is common to employ activatable materials within cavities. Upon being activated (e.g., by heat, moisture, or otherwise), the activatable material can bond to a surface and optionally may expand (e.g., if the activatable material employs a suitable blowing agent).

It is often the case that the activatable material must conform to a generally non-planar surface topography (e.g., a topography that has a bend, a curvature, or both). It must remain in place (and not delaminate) for a sufficient period of processing and/or storage or transport.

One solution for affording a material system capable adapting to a surface topography defining a hollow cavity is illustrated in commonly owned, U.S. Application Ser. Nos. 61/705,857 and 13/804,840. incorporated by reference for all purposes. See also, WO 2011/134943 (Hoefflin), incorporated by reference for all purposes. Nothwithstanding the above, there remains a need for additional solutions for achieving the stated objectives.

SUMMARY OF THE INVENTION

The present teachings contemplate a method for making an activatable material having a handling layer thereon, comprising the steps of providing a continuous mass of a polymeric material having a longitudinal axis and being capable of adhering to a metal surface; applying a handling layer (e.g., film) over at least one side of the mass; forming stress relief indentations in the mass, with the handling layer at least partially extending into the indentations, wherein the stress relief indentations allow a resulting part to be applied in conforming geometry with a surface to which it is applied (e.g., by way of a plurality of hinged segments. The teachings also contemplate parts made by the above method and use thereof to bond to surfaces having a non-planar portion.

Parts made in accordance with the present teachings have application in transportation vehicles (e.g., automotive vehicles). For example, such parts may employ an activatable material that, upon activation (e.g., by a suitable energy source, such as heat from a paint bake oven), will expand and cure to form a foamed material. The resulting activated material may have application for imparting structural rigidity or reinforcement (i.e., it may be what is regarded as a structural foam). The resulting activated material may have application for sealing and/or noise abatement. The resulting activated material may expand at least about 50%, 100%, 200%, 400%, 600%, or even 1000% of its original volume. The resulting activated material material may expand from its original volume, but in an amount that is below about 2500%, 2000% or even below about 1500% of its original volume, Advantageously, upon subjecting to certain energy application conditions, the handling film herein is capable of wetting out and functioning as an adhesive. Thus, no removal of the film is necessary prior to expansion of the activatable material, and the teachings herein contemplate a method that is free of any step of removing a handling film. As can be appreciated the teachings herein allow for the advantageous use of a mass of activatable material (e.g., a mass of material that has at least one tacky surface) for wrapping such material around a bent, folded or otherwise contoured substrate, without the need for application of mechanical fasteners (though, the teachings herein contemplate that mechanical fasteners such as push pin fasteners may be employed for securing the activatable material to the substrate). Upon application to the substrate, the activatable material will remain without delamination in its applied position on the contoured substrate for an extended period of time (e.g., up to about 24 hours, up to about 72 hours or longer), thereby allowing the substrate and activatable material to be processed for causing activation of the activatable material. For example, the substrate with activatable material may be subjected to heat from a paint bake oven (e.g., a temperature in the range of about 140 to about 200° C. or higher), such as following the application of an e-coat material.

Parts made in accordance with the teachings herein, and which include the disclosed spaced indentations, unexpectedly are generally more resistant to delamination when applied to bend angles higher than the maximum bend angle to which a material without the indentations can be subjected without delamination. Preferably parts herein (according to the general teachings) exhibit significantly higher bend angles without delamination than the maximum bend angle to which a material without the indentations can be subjected without delamination (e.g., 60, 70, 80, 90 or even 100° higher). Preferably parts herein (according to the general teachings) exhibit resistance to delamination when subjected to a relatively high bend angle (e.g., 60, 80, 100, 120 or even 140°) for extended periods (e.g., 24 hours, 48 hours, or even 72 hours).

DETAILED DESCRIPTION

Figure 1:
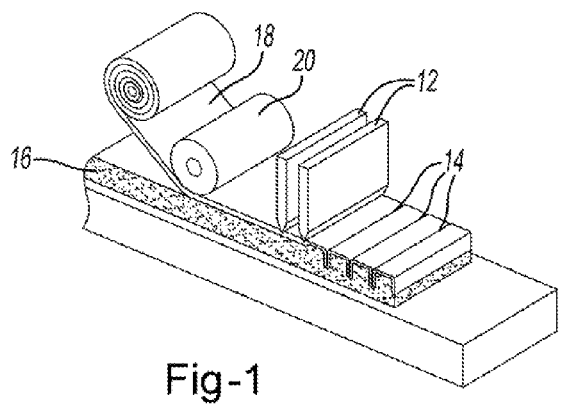
FIG. 1 is a perspective view of an illustrative assembly operation for making parts in accordance with the present teachings.

The present teachings make use of a combination of materials that allow an activatable material to be readily manipulated into difficult locations, and around bends and/or curvatures of surfaces to which it is applied.

In general, the teachings contemplate forming a mass of an activatable material (e.g., a heat activatable material). The mass of activatable material may have a longitudinal axis and a thickness.

The mass of activatable material may be formed by extrusion, by molding (e.g., injection molding), or otherwise. A preferred approach is to extrude the activatable material so that it exhibits a substantially constant profile (e.g., a generally rectangular profile, a profile having generally rounded corners, or both). Profiles may have any suitable shape and/or dimension. By way of example, they may have a generally rectangular profile with a height to width ratio ranging from about 1:10 to about 1:2 (e.g., about 1:4, about 3:10 or about 2:5).

Stress relief indentations are provided in at least one surface of the activatable material. The indentations may be generally perpendicular to the longitudinal axis. The indentations may penetrate a depth from an outer surface of the activatable material so that it is on the order of at least about 10%, 20%, 30% or higher of the overall thickness. The indentations may penetrate a depth from an outer surface of the activatable material so that it is on the order of less than about 70%, 60%, 50% or lower of the overall thickness.

The indentations may be formed by a blade that is depressed into the activatable material. Two or more generally parallel blades may be employed. The blades may be retractable or otherwise translatable into and out of the activatable material.

Optionally, a handling layer may be employed. The handling layer may cover one or more surfaces of the activatable material. The handling film may be a polymeric film that is capable of adheringly bonding to the activatable material. To the extent that the activatable material is tacky, the handling layer (e.g., film) may be such that it adhesively (and optionally, temporarily) bonds to the activatable material. The handling film may be generally tack free to the touch (e.g., at room temperature). Though described in a particular example as a film, the handling layer may be another form of material. For example, it may include a powder layer that is generally tack free to the touch at room temperature.

The activatable material may be activated when subjected to heat during paint shop baking operations. In applications where the activatable material is a heat activated, thermally expanding material, an important consideration involved with the selection and formulation of the material comprising the activatable material is the temperature at which a material reaction or expansion, and possibly curing, will take place. For instance, in most applications, it is undesirable for the material to be reactive at room temperature or otherwise at the ambient temperature in a production line environment. More typically, the activatable material becomes reactive at higher processing temperatures, such as those encountered in an automobile assembly plant, when the material is processed along with the automobile components at elevated temperatures or at higher applied energy levels, e.g., during paint or e-coat curing or baking steps. While temperatures encountered in an automobile assembly operation may be in the range of about 148.89° C. to 204.44° C. (about 300° F. to 400° F.), body and paint shop applications are commonly about 93.33° C. (about 200° F.) or slightly higher. Following activation of the activatable material, the material will typically cure. Thus, it may be possible that the activatable material may be heated, it may then expand, and may thereafter cure to form a resulting foamed material.

One or more sides of the activatable material may be tacky. Though it is also possible that one or more sides will be generally tack free to the touch at room temperature. One or more mechanical fasteners may be employed by attaching to or being formed integral with the activatable material, The teachings herein contemplate not only the method of making the parts herein, but also the method of using them. For example, the teachings contemplate attaching a part herein that includes the activatable material to a substrate (e.g., by adhesion from tackiness of the activatable material, by a fastener (e.g., a push pin fastener that is connected to the activatable material) or both). It will be seen, however, that by virtue of the geometries employed in accordance with the teachings, and by employment of a tacky activatable material, it is possible to avoid the need for any fastener. Thus, the methods herein may be free of a step of attaching with a fastener. The parts or resulting articles herein may be free of any fastener (e.g., they may be free of any mechanical fastener). The activatable material may be placed along a non-planar surface (e.g., a surface that is bent, folded or otherwise contoured), and due to the indentations may be able to substantially conform to the shape of the surface (e.g., over the contoured portion) while preserving the integrity of the activatable material mass (e.g., the mass may be deformed significantly around a contour, but will not rupture during installation into a vehicle cavity).

Figure 2:
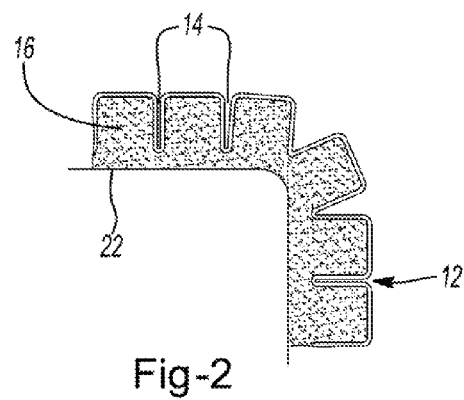
FIG. 2 is a side view illustrating the employment of parts herein on a surface of a component.
Figure 6A:
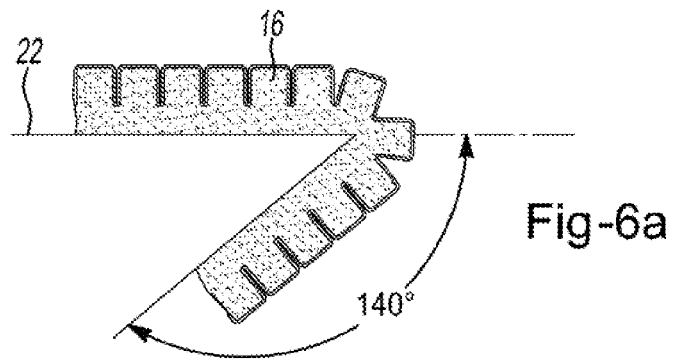
FIGS. 6a-6c are illustrations of applications of materials of the present teachings to a range of bend angles, and demonstrate how such materials remain bonded to an underlying substrate.
Figure 6B:
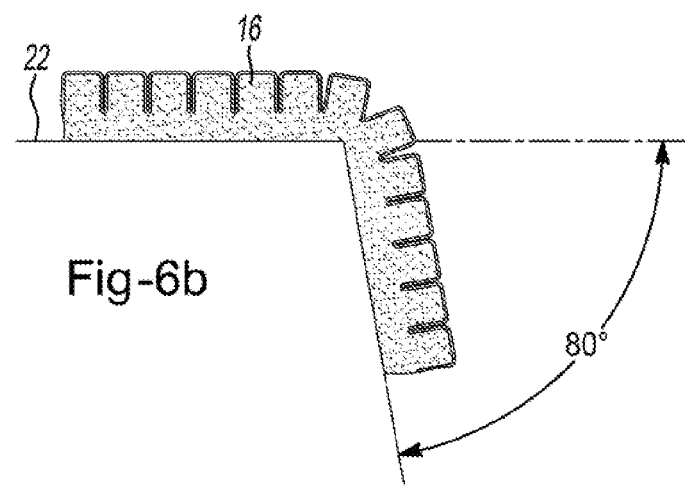
Figure 6C:
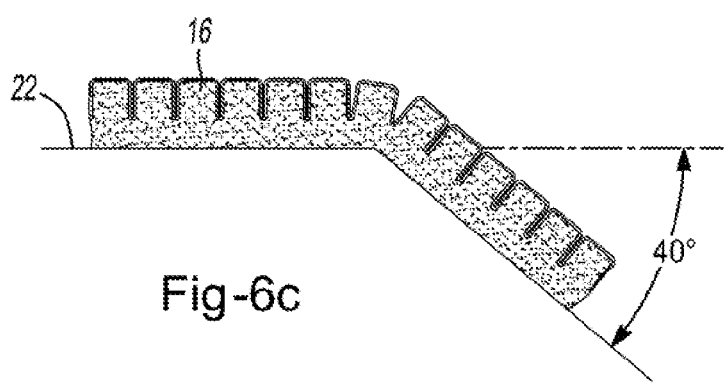
Figure 6D:
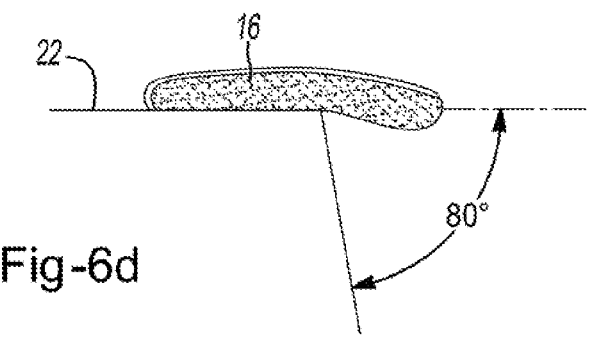
FIG. 6d is an illustration of a part without indentations, which illustrates delamination of an overhang portion.

The activatable material may be formed so that it will remain intact (without rupture) when bent around a body in excess of 90° to 180°, in excess of 270° or even 300° (e.g., it may be essentially folded about an edge of sheet metal) relative to a distal end point of the activatable material. Stated alternatively, the substrate may have a plane that is defined originally by a first end portion and a second end portion. However the second end portion is bent at an apex relative to the plane. Thus, relative to the plane of the first end portion of the substrate material, the activatable material can be folded in excess of 90°, or even in excess of 130°, (e.g., from about 60° to about 140° relative to the plane of the first end portion of the substrate material) in order to closely conform to a surface with one or more bends or contours. The material will remain attached to substrate and will avoid spring back delamination, due to the absence of a buildup of internal stress within the material from the indentations. For sake of illustration, FIG. 2 illustrates folding of about 90° relative to the plane of the material (i.e., relative to the plane of the first portion of the substrate material. FIGS. 6a-6d also illustrate examples of approximate bend angles for activatable material relative to a first portion of the shown substrate. As seen the bend is in a direction away from the surface having the indentations. However, it may be possible to bend in the opposite direction while retaining the activatable material on the substrate, FIG. 6d illustrates an example of delamination of an overhang portion of the material.

Suitable materials that may be employed for the activatable material mass include expandable materials and materials that do not expand. However, it is contemplated that the activatable material can be activated to form a foam. For instance, the material may be activated to form a structural foam (e.g., the material may include an epoxy ingredient). The material may be activated to form an acoustic foam. The material may be activated to flow for purposes of sealing a region within a cavity. The material may include a combination of a material that is activatable to expand and a material that is not activatable to expand.

Materials that may be employed for the activatable material may include a polyolefinic material. It may include an ethylene-based material. For example, it may include one or any combination of an ethylene acrylic copolymer, ethylene acrylate copolymer, ethylene propylene ethylidene norbornene terpolymer, ethylene vinyl acetate copolymer, a brominated olefin polymer, ethylene-propylene containing materials (e.g., ethylene propylene dicyclopentadiene rubber, ethylene propylene copolymer, or both). The material may include one or more hydrocarbon resins. It may include an isobutylene/butene copolymer. It may include filler (e.g., calcium carbonate). It may include a blowing agent or other ingredients. An example of a suitable material that may be employed for the activatable material mass is L-2664 available from L&L Products, Inc. (Romeo, Mich.). The activatable material may be generally tacky to the touch at room temperature. It may be generally tacky to the touch at room temperature throughout substantially the entirety of its mass, along at least one outer surface, or both. An example of a suitable composition can be found in U.S. Application Ser. No. 61/837,832, filed Jun. 21, 2013, the contents of which are expressly incorporated by reference.

An example of a suitable handling layer (e.g., film) may be made of a thermoplastic polymer (e.g., a vinyl, a polyolefin, a polyester or otherwise). One preferred material includes ethylene copolymer as a major component. For example, the layer may have as a major component one or more of ethylene methyl acrylate copolymer, ethylene vinyl acetate copolymer, ethylene methacrylic acid copolymer, or a combination thereof.

The layer may contain one or more additional ingredients such as an oxidized synthetic paraffin, an epoxy (e,g., a diglycidyl ether bisphenol A epoxy), a hydrocarbon resin (e.g., an aromatic hydrocarbon resin), a filler, a curing agent, synthetic graphite, carbon black or any combination thereof. The layer may have a thickness below about 500 microns, below about 250 microns, or even below about 100 microns (e.g., it may be below about 50 microns). For example, the thickness may be about 0.02 to about 0.03 mm. An example of a suitable commercially available film is L-3801 or L-3803, available from L&L Products, Inc. (Romeo, Mich.). The layer may remain in place after installation into a vehicle cavity. It may be such that it will react and integrate itself with the underlying activatable material. Though not necessarily preferred, it is still possible that the handling layer (e.g., film) nonetheless may be at least partially removed over some or all of its length prior to activation of the activatable material. The handling layer may be provided in the form of a roll for lamination onto a mass of activatable material. The handling layer desirably may be sufficiently tough and strong that it will resist puncture during the formation of the indentations, and will withstand the induced bend (e.g., during a step of installation into an automotive vehicle) without rupture.

The teachings thus contemplate that a mass of activatable material is provided with a handling layer (e.g., filmy The mass (which may be extruded and have a generally constant profile along its longitudinal axis) may be subjected to pressure from one or more blades (e.g., blades that are sufficiently dull that they will not rupture the handling layer, but sufficiently strong that they will indent the mass of activatable material and effect penetration (and possibly stretching) of the handling layer into the activatable material. It is thus possible that the handling layer stretches as the blades press into the material, lining the walls of the indentations with stretched film. Thus, in general, resulting parts herein can have segments of plastically deformed film and film that is free of plastic deformation. The blades may be retractable, such that upon retraction, the handling film remains within the indentations. Tension relief can thus be provided as the overall material (activatable material with handling layer) is bent along a contoured surface defining a cavity into which the material is placed. The handling layer may also pull out of the indentations as needed, to help relieve surface tension as the part is stretched during installation.

Lamination of the handling layer (e.g., film) to the activatable material may be done at room temperature. It is possible, however, that lamination can take place at an elevated temperature, e.g., above room temperature in the presence of heat.

The ratio of the depth of indentations relative to the thickness of the mass of activatable material may be at least 1:10, 2:10, 3:10 or larger. The ratio of the depth of indentations relative to the thickness of the mass of material may be less than 9:10, 8:10, 7:10 or smaller.

The indentation may extend along the entire width of the mass of activatable material. It may extend only partially along the width of the mass (e.g., over at least about 50% of the width). Indentations may be in spaced increments, e.g., in the range of about 2 to about 10 mm (e.g., about 5 mm).

FIGS. 1 and 2 illustrate an example in accordance with the present teachings. An indented structure 10 is formed by one or more blades 12 that form indentations 14 to an activatable material 16. A handling layer (e.g., film) 18 is laminated (e.g., via a roll 20) ahead of the blades. The resulting activatable material may be attached to a substrate 22 (e.g., sheet metal of an automotive vehicle body). When the material bends around a corner it will not detach from the substrate as a result of internal stresses. As can be appreciated, this approach may employ a common carrier (e.g., a handling film layer) for a plurality of hinged segments. However, the carrier (e.g., the handling film) may be on only one side of activatable material, and the resulting structure may be free of activatable material on opposing sides of a carrier. Further as seen, a plurality of hinged segments may be possible, according to the teachings herein, in which the each of the segments contacts each adjoining segment.

Figure 3:
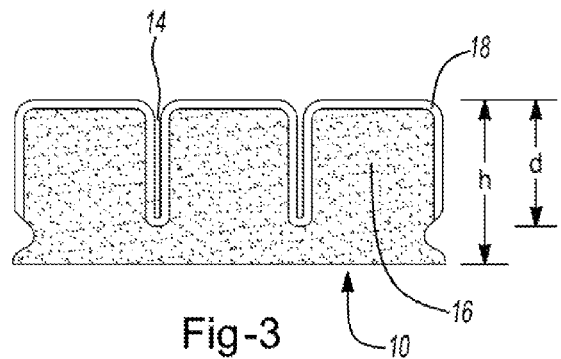
FIG. 3 is an enlarged side view of parts in accordance with the teachings herein.

FIG. 3 illustrates an enlarged view of a part 10 in accordance with the present teachings. As seen, indentations 14 in a top surface separate the activatable material 16 into segments. The indentations have a depth (d), and the parts have an overall height (h). The height (h) may range from about 1.5 to about 8 mm or larger. For example, it may be about 3 to about 4 mm. The indentation penetrates the top surface to a depth that is about 1 to about 2 mm from the bottom surface of the part. Accordingly, the ratio of height to depth may range from about 1.5:1 to about 8:1.

Figure 4A:
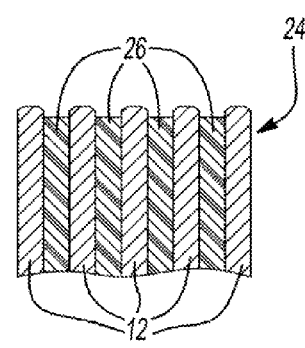
FIG. 4a is a side view of a straight bladed tool useful in accordance with the present teachings.
Figure 4B:
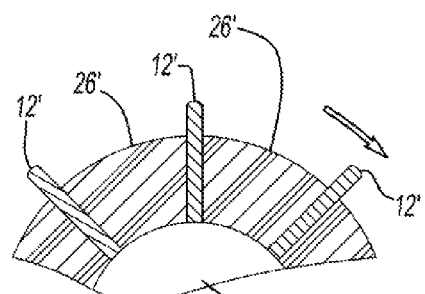
FIG. 4b is a partial side view of a rotary bladed tool useful in accordance with the present teachings.

FIGS. 4a and 4b illustrate examples of blade arrangements for achieving the indentations. A plurality of blades 12 are aligned generally parallel to each other in FIG. 4a, with an optional elastic spacer material 26 disposed between them. A frame (not shown) carries the blades and spacer material in fixed relation to each other. In FIG. 4b, the blades 12' project radially outward from a hub 28 with an optional elastic spacer material disposed between them. The hub is adapted for rotational movement. In the course of manufacturing, for both of the above, the blades are brought into opposing relationship with an anvil, with the activatable material (with handling layer) disposed therebetween. Pressure causes indentations to form. The elastic spacer material serves to elastically deform in response to opposing forces while the activatable material is being compressed to form indentations. It effectively serves as a spring to then cause the activatable material (and handling layer) to be expelled from between blades. Material may be advanced for forming indentations by use of a stepper motor.

Figure 5A:
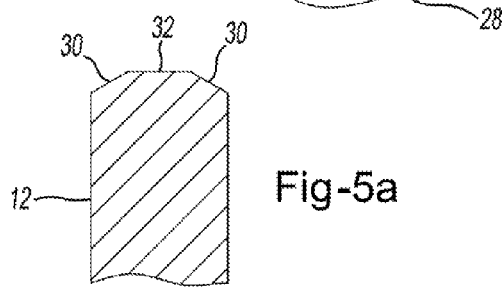
FIG. 5a is an enlarged view of an illustrative tip of a tool of FIG. 4a or FIG. 4b.
Figure 5B:
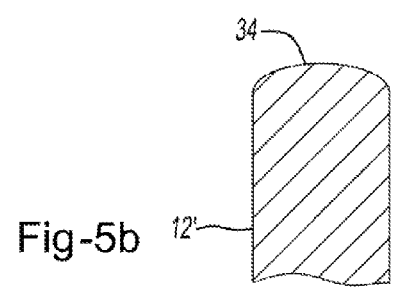
FIG. 5b is an enlarged view of another illustrative tip of a tool of FIG. 4a or 4b.

FIGS. 5a and 5b illustrate examples of blade tips for the illustrative blades of FIGS. 4a and 4b. In FIG. 5a, it is seen that the blade tips may have chamfered corner surfaces 30 and a flat tip surface 32. In FIG. 5b, it is seen how a tip can have an arcuate surface 34.

The blades of the example of FIG. 4b can be substituted for the blades of the example of FIG. 4a and vice versa.

The manufacture of parts may be done on a generally continuous basis. For example, a profile of the activatable material may be extruded onto a layer of release paper. The handling layer may be laid over the activatable material. The resulting combination may then be subjected to application of pressure by the blades for forming indentations. The elastic material (e.g., a polymeric die foam) between blades may then expel any of the material that is lodged between the blades due to spring-like forces occasioned by the intrinsic material properties.

Though a release layer may be employed for transport of the parts herein, the parts herein may be free of a carrier layer (e.g., free of a mesh tape or other like layer) that supports an underside of the activatable material when it is placed onto a substrate. As applied to a substrate, the part may consistent essentially of, or even consist of, the activatable material and the handling layer, wherein the handling layer is located distal of the substrate, while the activatable material is located proximate (or in direct contact with) the substrate.

Parts may be applied to a substrate by removing the activatable material with handling layer thereon and applying a tacky side of activatable to a substrate. Suitable pressure may be applied to help assure at least a temporary bond between the activatable material and the substrate prior to subjecting to activation conditions. Thereafter, the substrate with the activatable material (and handling layer) thereon may be subjected to activation conditions (e.g., heat from an oven (e.g., a paint bake operation oven), at which time the activatable material will be activated to flow, foam, and/or cure, while also adheringly bonding to the substrate and possibly another adjoining or opposing substrate (e.g., substrates defining a cavity within a vehicle structure that is to be filled by the activatable material upon foaming).

At a point of bending (e.g., at an apex in a bend of the substrate), there will be a first portion of the overall length of the activatable material on one side of the bend and a second portion of the overall length of the activatable material on the other side of the bend. The ratio of the length of the first portion to the second portion of the overall length may range from about 1:1 to about 10:1, and more preferably about 1:1 to about 5:1.

The handling layer may be such that it is capable of at least partial plastic deformation in response to force applied during the formation of indentations. The handling layer may be such that when it is wrapped about a contoured surface the layer will withstand rupture. Thus, there may be some local elongation of the layer. In a bend, the handling layer may become partially removed from the underlying activatable material, while still remaining in bridging contact with the activatable material on sides opposite where the partial removal has occurred. In this manner, it is also possible that any separation of the activatable material that has occurred during bending can be kept in close proximity with each other, being kept in place by the film. Thus, during activation, any adjoining separated masses of the activatable material are positioned sufficiently close to each other so that they can bond to each other.

As indicated elsewhere herein, during a step of activating the activatable material to form an activated material (e.g., a foam), the handling layer is such that it will wet out and cover at least a portion of the activated material. The handling layer effectively can become a part of an adhesive outer layer that can bond to an opposing substrate.

EXAMPLES

By way of non-limiting example, to illustrate a technical benefit derived from the teachings herein, generally rectangular profiles of an activatable material having the composition of Table 1 are extruded and a handling layer having the composition of Table 2 is applied. The profiles range from about 3 to 5 mm in height and are 10 to 20 mm in width. Thus, the height to width ratio (as with the teachings elsewhere herein) may range from about 3:20 to about 1:2. The thickness of the handling layer is about 0.02 mm.

The activatable material is applied to a steel substrate, which may have residual stamping oil thereon (e.g., Quaker Ferrocote 61MAOHC1). The activatable material is applied so that a length of about 50 mm of the sample is on one side of an apex defied by the bend, and an overhang length of about 15 mm is on the other side. Failure occurs when the overhang portion delaminates from the substrate (e.g., as seen in FIG. 6d).

In general, materials having indentations are capable of withstanding bend angles on the order of about 60° larger than materials without the indentations. However, for some geometries, it may be possible to withstand bend angles of 100° or even 120 larger than materials without the indentations. For example, for a rectangular profile of 3 mm height and 10 mm width, indentation samples can remain bonded for about 24 hours to a steel substrate for a bend of approximately 180°. In contrast, a like sized sample without indentations exhibits delamination at a substrate bend angle of about 80° over the same time period.

TABLE 1

| Ingredient | Preferred parts by weight (pbw) | More preferred parts by weight (pbw) | Most preferred parts by weight (pbw) |
|---|---|---|---|
| Masterbatch of: Brominated Olefin Polymer (11.79 pbw)(e.g., Bromobutyl 2030 from Lanxess) Ethylene Propylene Ethylidene Norbornene Terpolymer (9.82 pbw)(e.g., Trilene 67 from Lion Coplymer) P-Aramide (0.2 pbw) (e.g., Kevlar 1F543 from DuPont) Ethylene-propylene dicyclopentadiene rubber (19.65 pbw) (e.g., Royalene 301T from Lion Copolymer) | 23.5-27.5 | 25-26 | 25.45 |

TABLE 1-continued

| Ingredient | Preferred parts by weight (pbw) | More preferred parts by weight (pbw) | Most preferred parts by weight (pbw) |
|---|---|---|---|
| Ethylene Propylene Copolymer (7.86 pbw)(e.g., Vistalon 7001 from ExxonMobil) | | | |
| Ethylene Vinyl Acetate Copolymer (3.92 pbw) (e.g., Elvax 40W from DuPont) | | | |
| Ethylene Butyl Acrylate Copolymer Blend (19.65 pbw)(e.g., Elvaloy 34035EAC from DuPont or Lotryl 35BA40) | | | |
| Ethylene Acrylate Copolymer (7.86 pbw)(e.g., Elvaloy 4170 from DuPont) | | | |
| Carbon Black (1.18 pbw) (e.g., Raven 410 from Columbian Chemicals) | | | |
| hydrocarbon Resin (18.07 pbw)(e.g., Novares C-100 from Rutgers VFT AG) | | | |
| Severely Solvent Refined Petroleum Hydrocarbon Oil (e.g., Sunpar 2280 from Sunoco) | 9-13 | 10.5-11.5 | 11.00 |
| Polybutene (Isobutylene/butene copolymer)(Indopol H-1500 from Ineos or TPC 1285 from Texas Petroleum) | 13-17 | 14-16 | 15.00 |
| Modified Polyterpene Type Hydrocarbon Resin (e.g., Wingtack 86 from Sartomer) | 8.5-11 | 9-10.5 | 9.70 |
| Calcium Carbonate (e.g., GPR 325 or GFP 325 from Carmeuse or Hubercar Q325 from Huber) | 26.5-30 | 28-28.5 | 28.16 |
| Azodicarbonamide (e.g., Azofoam VI-30 or VC-30 from Otsuka or Celogen AZ120 from Lion Coplymer) | 5-6.5 | 5.6-6.0 | 5.80 |
| Phenolic Resin(e.g., Resin P-101 from Akrochem) | 0.5-1.5 | 0.9-1.1 | 1.00 |
| Dicyandiamide (e.g., Amicure CG1200G from Air Products) | 0.1-0.3 | 0.15-0.25 | 0.20 |
| Zinc Oxide, Nonferrous Metal Oxide (e.g., Zoco 100 from Zochem or Kadox 930 from Horsehead) | 1-3 | 1.5-2.5 | 2.00 |
| Dipentaerythritol Pentaacrylate (e.g., SR399 from Sartomer) | 0.25-0.5 | 0.38-0.4 | 0.39 |
| 1,1-bis(t-butylperoxy)-3,3,5-trimethyl cyclohexane, carbonic acid calcium salt & calcium silicate (e.g., Luperox 231XL40 from Arkema) | 0.8-1.6 | 1.1-1.3 | 1.20 |
| Dibenzoyl Peroxide & Dicyclohexyl Phthalate (e.g., BP-50-FT from United Initiators) | 0.05-0.15 | 0.08-0.12 | 0.10 |

TABLE 2

| Ingredient | Preferred Parts by weight (pbw) | More Preferred Parts by Weight (pbw) | Most Preferred Parts by Weight (pbw) |
|---|---|---|---|
| Ethylene Methyl Acrylate Copolymer (e.g., EMAC SP2220 from Westlake) | 48-55 | 50-53 | 51.3 |
| Oxidized Synthetic Paraffin (e.g., Paraflint A28 from Moore & Munger, Sasolwax A28 from Sasol, or CWP-500 from Chusei Waxtech) | 17-23 | 19-21 | 20.7 |
| DGEBPA-based polymer (e.g., DER 661 from Dow) | 2-4 | 2.8-3.2 | 3 |
| Dicumyl Peroxide (40%) & Kaolin (60%) (e.g., DI-CUP 40KE from Arkema) | 0.5-1.5 | 0.8-1.2 | 1 |
| Cyanoguanidine (e.g., Amicure CG-325 or CG-325G from Air Products) | 0.18-0.22 | 0.15-0.25 | 0.2 |
| Aromatic Hydrocarbon Resin (e.g., Norsolene S-105 from Sartomer, Nevex 1069 from Neville, Norsolene S-105E from Cray Valley or Bitoner BT-100 from Aalchem) | 6.5-8.5 | 7.0-8.2 | 7.7 |
| Ground High Calcium Carbonate (e.g., Benwood Talc BT 2203 from IMI Fabi) | 14-18 | 15.5-16.5 | 16 |
| Carbon Black (e.g., Raven 410 from Columbian Chemicals) | 0.05-0.15 | 0.08-0.12 | 0.1 |

General Comments

As used herein, unless otherwise stated, the teachings envision that any member of a genus (list) may be excluded from the genus; and/or any member of a Markush grouping may be excluded from the grouping.

Unless otherwise stated, any numerical values recited herein include all values from the lower value to the upper value in increments of one unit provided that there is a separation of at least 2 units between any lower value and any higher value. As an example, if it is stated that the amount of a component, a property, or a value of a process variable such as, for example, temperature, pressure, time and the like is, for example, from 1 to 90, preferably from 20 to 80, more preferably from 30 to 70, it is intended that intermediate range values such as (for example, 15 to 85, 22 to 68, 43 to 51, 30 to 32 etc.) are within the teachings of this specification. Likewise, individual intermediate values are also within the present teachings. For values which are less than one, one unit is considered to be 0.0001, 0,001, 0.01, or 0.1 as appropriate. These are only examples of what is specifically intended and all possible combinations of numerical values between the lowest value and the highest value enumerated are to be considered to be expressly stated in this application in a similar manner. As can be seen, the teaching of amounts expressed as "parts by weight" herein also contemplates the same ranges expressed in terms of percent by weight. Thus, an expression in the of a range in terms of "at least 'x' parts by weight of the resulting composition" also contemplates a teaching of ranges of same recited amount of "x" in percent by weight of the resulting composition."

Unless otherwise stated, all ranges include both endpoints and all numbers between the endpoints. The use of "about" or "approximately" in connection with a range applies to both ends of the range. Thus, "about 20 to 30" is intended to cover "about 20 to about 30", inclusive of at least the specified endpoints.

The disclosures of all articles and references, including patent applications and publications, are incorporated by reference for ail purposes. The term "consisting essentially of to describe a combination shall include the elements, ingredients, components or steps identified, and such other elements ingredients, components or steps that do not materially affect the basic and novel characteristics of the combination. The use of the terms "comprising" or "including" to describe combinations of elements, ingredients, components or steps herein also contemplates embodiments that consist of, or consist essentially of the elements, ingredients, components or steps.

Plural elements, ingredients, components or steps can be provided by a single integrated element, ingredient, component or step. Alternatively, a single integrated element, ingredient, component or step might be divided into separate plural elements, ingredients, components or steps. The disclosure of "a" or "one" to describe an element, ingredient, component or step is not intended to foreclose additional elements, ingredients, components or steps.

It is understood that the above description is intended to be illustrative and not restrictive. Many embodiments as well as many applications besides the examples provided will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes. The omission in the following claims of any aspect of subject matter that is disclosed herein is not a disclaimer of such subject matter, nor should it be regarded that the inventors did not consider such subject matter to be part of the disclosed inventive subject matter.

What is claimed is:

1. An activatable part comprising:
    a) an activatable material mass having a height (h), and including a base and an upper surface, the activatable material mass being generally tacky to the touch at room temperature;
    b) a handling layer disposed on the entire upper surface, the handling layer being a film which is generally tack free to the touch at room temperature and laminated onto the activatable material mass;
    c) a plurality of stress relief indentations having a depth (d) formed in the upper surface, the plurality of stress relief indentations including the handling layer, wherein each indentation extends over at least 50% of the width of the activatable material mass, and wherein the base is defined by a portion of the activatable material mass that lies below the indentations;
    wherein the activatable part is adapted to apply to a contoured surface of a substrate and remain in place along the contoured surface without pull back due to internal stress of the activatable part;
    wherein the activatable material mass is compressed to form the plurality of stress relief indentations;
    wherein the activatable material mass is a heat activatable, thermally expanding material; and
    wherein when the activatable material mass is activated the activatable part is adapted for providing baffling and/or structural reinforcement.

2. The activatable part of claim 1, wherein the ratio of height to depth ranges from about 1.5:1 to about 8:1.

3. The activatable part of claim 2, wherein the activatable material mass is adapted to directly contact the substrate.

4. The activatable part of claim 2, wherein the activatable material mass is adapted to directly bond to the substrate in the absence of a fastener.

5. The activatable part of claim 3, wherein upon exposure to heat in a paint bake operation the handling layer wets out and adheres to a surface and does not detract from the ability of the activatable part to seal a cavity.

6. The activatable part of claim 5, wherein the depth is about 2 to 3 mm and the height is about 3 to 4 mm.

7. The activatable part of claim 6 wherein a lateral spacing of the indentations is about 0.5 to about 1.5 mm.

8. The activatable part of claim 7, wherein the film includes as a major component one or more of ethylene methyl acrylate copolymer, ethylene vinyl acetate copolymer, ethylene methacrylic acid copolymer, or a combination thereof.

9. The activatable part of claim 8, wherein the film includes ethylene methyl acrylate copolymer as a major component, and further includes an oxidized synthetic paraffin.

10. The activatable part of claim 9, wherein the activatable material mass includes a polyolefinic material.

11. A method for making the activatable part according to claim 1 comprising the steps of:
    a. providing a continuous mass of a polymeric material having a longitudinal axis and being capable of adhering to a metal surface;
    b. applying the handling layer over at least one side of the continuous mass;
    c. forming the plurality of stress relief indentations in the continuous mass, with the handling layer at least partially extending into the indentations, wherein the plurality of stress relief indentations allow a resulting part to be applied in conforming geometry with a surface to which it is applied.

12. The method of claim 1, wherein the step of providing the continuous mass includes extruding the continuous mass through a die.

13. The method of claim 2, wherein the step of providing the continuous mass includes extruding the continuous mass through the die to define a generally rectangular profile.

14. The method of claim 3 wherein the step of providing the continuous mass and the step of applying the handling layer are performed as continuous steps.

15. The method of claim 4, wherein the step of forming plurality of stress relief indentations is performed by a device that includes a plurality of blades having tips for contacting the handling layer and applying pressure to the film and the continuous mass underlying it.

16. The method of claim 5, wherein the plurality of blades are separated by a resilient material that elastically deforms upon contacting the film and applying pressure and which returns to its non-deformed state for causing any of the continuous mass of the polymeric material to be released from between the plurality of blades.

17. The method of claim 16, wherein the tips of the blades have a radius of curvature, the tips have a plurality of flat surfaces or both.

18. The method of claim 17, wherein the blades are secured together generally parallel to each other, or wherein the blades are secured together so that they project radially outward from a hub.

19. The method claim 17, wherein the blades are secured together generally parallel to each other and the blades are reciprocally brought into contact with the continuous mass having the handling layer thereon that is successively advanced between the blades and an anvil by use of a stepper motor.

20. The method of any claim 15 wherein the plurality of stress relief indentations are generally elongated and perpendicular to the longitudinal axis.

* * * * *